Patented Jan. 4, 1949

2,458,292

UNITED STATES PATENT OFFICE 2,458,292

METHOD OF RETARDING THE REVERSION OF ALKALI-METAL PHOSPHATE GLASS IN AQUEOUS SOLUTIONS AND A COMPOSITION OF MATTER THEREOF

Casimir J. Munter, Upper St. Clair Township, Allegheny County, Pa., assignor to Hall Laboratories, Inc., Pittsburgh, Pa., a corporation of Pennsylvania No Drawing. Application January 2, 1945, Serial No. 571,116

7 Claims. (Cl. 252—175)

This invention relates to a composition containing hardness sequestering phosphate and stabilizing agents that retard loss of efficiency of the phosphate when in solution and to the treatment of aqueous solutions of phosphate glasses whereby the rate of loss of sequestering power of phosphate glasses may be substantially retarded or the loss of sequestering power may be controlled or regulated to approximately predetermined rates under given conditions of use.

The unusual properties of the alkali-metal phosphate glasses have led to their wide usage in numerous applications. Many of these applications depend on the ability of the phosphate glasses to form soluble complex salts with the ions of metals in solution, to stabilize super-saturated solutions of ordinarily insoluble salts, to form adsorbed films on metal surfaces, and to disperse insoluble compounds through adsorption on the solid particles. These glassy phosphates also have the property of reverting to less complex phosphates in aqueous solution by combining with water to form acid phosphates in solution. The acid phosphates thus formed have for all practical purposes, substantially none of the desirable properties of glassy phosphates noted above. However, this property of reversion is of value in some applications where the precipitating power or neutralizing power of the reversion products are desired in any given application or use of the phosphates.

In certain applications, this change—loss of sequestering power or the increase of reversion—is so slight as to be of little or no practical significance. However, in other applications, loss of sequestering power occurs so rapidly and the reversion to orthophosphate is completed in such a short period of time, that glassy phosphates cannot be used to much greater advantage than the orthophosphates or non-sequestering phosphates.

The factors affecting reversion of the sequestering glassy phosphates are the concentration of phosphate glass in solution, the pH value of the solution, the concentration of ions capable of forming complexes with the phosphate, and the temperature of the solution. Concentration of phosphate glass in solution exerts only a minor effect on the rate of reversion, the rate appearing to decrease with an increase in concentration. Solutions having pH values in the approximate range of 6 to 10.5 are quite stable at room temperature, but lowering or raising the pH value beyond these limits hastens reversion. Although increasing the concentration of ions capable of forming complexes in aqueous solutions with the phosphate glasses accelerates the rate of reversion at pH values outside the range of 6 to 10.5, within these limits, ion concentration seems to have little or no effect on the rate of reversion. Temperature more than any of the aforementioned factors affects the rate of reversion of the phosphate glasses.

In many industrial applications, combinations of two or more unfavorable factors such as high temperatures, high pH values, and high concentrations of complex-forming ions, are encountered in certain textile operations, so that the valuable properties of the glassy phosphates may not be realized. In such circumstances, substantial effectiveness of the phosphate glasses may be realized only by frequent additions of fresh phosphate glass to the processing solutions, but in many such cases the cost of using the glassy phosphates in such large amounts is prohibitive.

By way of example, the effect of concentration on the loss of effectiveness of a phosphate glass through reversion or hydration may be observed by preparing a distilled water solution of 0.8% by weight of a phosphate glass having a composition of 67% phosphorous pentoxide ($P_2O_5$) and 33% sodium oxide ($Na_2O$). This solution if maintained at room temperature for 270 days will lose approximately 75% of its sequestering effectiveness as measured by a calcium repression test which will be described. The same glass in a concentration of 23.6% by weight will lose approximately 50% of its effectiveness in 360 days, the time required for a loss of 75% in effectiveness being much longer than a year.

If a solution containing 0.8% by weight of this same glass is heated to the boiling point, the phosphate will lose about 75% of its effectiveness in a little over 2.5 *hours*. As in the case of changes in concentration, the effect of pH value can be detected at room temperature only over long periods. If the pH value of an 0.8% solution of the phosphate glass is raised to 8.3 by adding sodium carbonate ($Na_2CO_3$) the rate of reversion under continuous boiling is about the same as for a solution of equal concentration in the absence of $Na_2CO_3$. However, if to the 0.8% solution of phosphate glass, 1.4% of sodium carbonate ($Na_2CO_3$) based on the weight of the solution is added so that the pH value of the solution is about 10.5, the phosphate glass will lose about 75% of its effectiveness in about 6 hours; and the glassy phosphate tends to stabilize at 25% of its original effectiveness through the formation of pyrophosphate, whose effectiveness is lost at a slow rate characteristic of pyrophosphate. If the 0.8% solution of phosphate glass is made alkaline with sodium hydroxide (NaOH) in the concentration of 1.4% by weight of the solution so that the pH value of the solution is about 11.7, the time required for a 75% loss in effectiveness is reduced to about 2 hours, indicating that at higher pH values, the beneficial effect of alkaline materials is lost. When pH values are reduced below the minimum in the range of 6 to 10.5, the rate of reversion is accelerated and there is no stabilization by the formation of stable reversion products.

The effect of added metal ions entering into complex formation with the glassy phosphate is best shown by calcium ions. The presence of calcium ion ($Ca^{++}$) in solutions of a glassy phosphate exhibits little effect on the reversion of solutions having pH values in the range of 6 to 10.5 or solutions whose pH value is below 6. However, in those solutions where rate of reversion is high because of elevated pH values, the presence of calcium stimulates or accelerates reversion. The 0.8% solution of phosphate glass to which 1.4% of sodium hydroxide (NaOH) has been added will revert in less than 30 minutes at boiling temperature when calcium is present in the solution.

I have found that certain crystalline alkaline compounds hereinafter identified when used with the glassy phosphates tend to stabilize the glassy phosphates in aqueous solution. This stability is manifest by a resistance against loss of sequestering power or efficiency and by much slower rates of reversion. The glassy phosphates are thus maintained in effective condition for much longer periods of time. To stabilize sodium phosphate glasses, I may add to the phosphate solution alkaline potassium, lithium, ammonium, and other non-sodium alkali-metal compounds such as the carbonate, bicarbonate, orthophosphate, pyrophosphate, tripolyphosphate, silicate, and hydroxide. These stabilizing compounds are crystalline and alkaline reacting. Fully neutralized as well as partially neutralized alkaline salts may be employed. Non-sodium alkali metal salts of organic acids yielding alkaline solutions, such as soaps or synthetic detergents, may also be used. I may also employ those organic amines and those salts of organic amines which are alkaline in solution. For the stabilization of potassium phosphate glasses, crystalline alkaline non-potassium compounds of the types mentioned above are used.

All phosphate glasses of a given alkali-metal may be stabilized in this manner. Thus in the sodium oxide ($Na_2O$)-phosphorus pentoxide ($P_2O_5$) system or the potassium oxide ($K_2O$)-phosphorus pentoxide ($P_2O_5$) system, the glasses may vary in molar ratio of alkali metal oxide to phosphorus pentoxide from 0.8:1 to 1.67:1. Glasses having an 0.8:1 ratio are acid in solution; glasses having a 1:1 ratio are practically neutral in solution. Glasses whose ratio is over 1:1 are alkaline in solution.

In addition to the simple alkali-metal oxide-phosphorus pentoxide glassy system, those glasses in the system water-alkali metal oxide-phosphorus pentoxide containing limited amounts of water may also be stabilized. The ratio of the sum of the water and alkali metal oxide to phosphorus pentoxide may vary from 0.8:1 to 1.67:1, with the water ranging from a trace to about 0.2 mol.

The alkaline-metal phosphate glasses may be stabilized with alkali metal compounds whose alkali metal is other than the alkali metal of the phosphate glass. Effective stabilization of alkali-metal phosphate glasses cannot be obtained by the use of alkaline compounds having the same alkali metal as that of the phosphate glass. Although such alkaline compounds produce a slight stabilizing action which is apparently related to pH value, the effect is slight when compared to that obtained by using a compound whose alkali-metal is dissimilar to that of the glass which is to be stabilized against reversion or whose sequestering efficiency is to be prolonged under the conditions in which it is used.

It is not enough to add only sufficient stabilizing compound to make the solution of the glassy phosphate alkaline. A fairly definite minimum concentration must be used to obtain the desired effect, the amount depending upon both the phosphate glass and the stabilizing compound selected.

In the interest of clarity of description of the invention, I designate as acid phosphate glasses those which in aqueous solution have a pH value of less than 7; neutral phosphate glasses those having a pH value in the range of 7–8.3; alkaline phosphate glasses those having a pH value greater than 8.3.

For glasses that are acid or neutral, i. e. whose pH values are less than 8.3, I first add sufficient alkali to increase the pH value to 8.3. Although I prefer to both adjust the pH value to 8.3 and stabilize the phosphate glass with an alkali-metal compound whose alkali metal is dissimilar to the alkali-metal of the phosphate glass, in certain instances I may adjust the pH value of a neutral or acid glass with an alkaline compound having the same alkali-metal as that of the glassy phosphate and then stabilize the glass in its efficient form with an alkaline alkali-metal compound having an alkali-metal other than that of the glass. I have found that adjustment of pH value and stabilization by means of alkali-metal compounds having alkali-metal ions other than that of the phosphate glass is the most satisfactory procedure to follow. The stabilizing alkaline compound, however, must be one whose alkali-metal is other than that of the glassy phosphate.

The amounts of alkali required to increase the pH value of solution of neutral glass are small, being approximately 1–10% of the weight of the glass depending on the type of alkali used and the pH value of the glass.

The amounts of alkali required to adjust solutions of the acid glasses may range as high as 50% of the weight of the glass depending on the acidity of the glass and the alkali used to raise the pH value to 8.3. Alkaline glasses whose solutions have pH values of 8.3 or greater do not require adjusting alkali.

The minimum amount of alkali required to effect stabilization of a phosphate glass solution whose pH value has been adjusted to 8.3, is that required to assure neutralization of the acid phosphate as and when formed, considering the reversion as yielding pyrophosphate. While it is not certain that the initial hydration products of the glassy phosphate is a pyrophosphate the minimum amounts of alkali necessary to effect stabilization of solutions of the phosphate glasses indicates that pyrophosphate is formed in the process of reversion, although the ultimate reversion product is orthophosphate. To obtain maximum stabilization of a glassy sodium phosphate having an $Na_2O:P_2O_5$ (sodium oxide-phosphorus pentoxide) ratio of 1:1, the alkaline stabilization requirement in terms of alkali per part of glass for various alkaline compounds would be, for example, approximately 1.0 part $KHCO_3$, 0.65 part $K_2CO_3$, 0.55 part KOH, and 0.37 part $Li_2CO_3$. These stabilizing compounds are crystalline and alkaline reacting. The ultimate pH values of solutions stabilized by these different compounds will vary from about 8.3 to values over 12. This variation in pH value does not exhibit any effect on the stability of the solutions where sodium phosphate glass solutions are stabilized by alkaline potassium compounds, but when alkaline sodium compounds having high pH values are added to solutions of the same phosphate glass, practically no stabilizing effect is noted.

Where I desire stability of solutions of sodium phosphate glass for definite periods of time after which reversion to less efficient complex phosphates may occur without objection, I may by employing lower concentrations of stabilizing alkaline compounds control the rate of reversion or rate of loss of sequestering power or efficiency. If stability is not required beyond a certain length of time, I may employ from one-third of the maximum up to the full amounts of alkaline stabilizing materials designated above for maximum stabilization. If less than one-third of the amounts required for maximum stabilization are used the reversion is not, for all practical purposes, controllable.

The maximum amount of any of the selected stabilizing compounds to be used is limited only by its solubility in solution with the phosphate glass; practical requirements will rarely call for such high concentrations.

The stability of solutions of the compositions containing phosphate glasses and stabilizing alkali when they are dissolved in water may be determined as follows:

A sample of the solution is subjected to selected conditions under which information on stability is desired. At intervals, portions are taken from the test sample and the sequestering efficiency thereof is tested for its ability to form complex salts with calcium and to redissolve calcium soap.

For this test, 50 ml. of a calcium nitrate solution containing 0.1 mg. of calcium (Ca) per ml. are placed in a 300 ml. soap test bottle. 0.5 ml. of standard A. P. H. A. soap solution and 2 or 3 drops of phenolphthalein indicator are added. To this solution, 2 ml. of the solution of the stabilized phosphate composition to be tested is added. If, after this addition, the contents of the bottle are not faintly pink to phenolphthalein, dilute caustic soda solution is added until a faint pink is obtained. If the solution is strongly pink, the color must be discharged by adding dilute hydrochloric acid solution and readjusting to a faint pink color by a further addition of dilute caustic soda solution.

The dilute caustic soda solution employed in this test may be prepared by dissolving 4 grams of caustic soda in distilled water and diluted to 1 liter. The dilute hydrochloric solution may be prepared by dissolving 8.52 ml. of concentrated hydrochloric acid in distilled water and diluting to 1 liter.

After the adjustment of the pH value has been completed, the bottle should be shaken for about ½ minute, laid on its side and examined to observe whether a suds has developed on the surface of the solution. If a suds is present, the bottle is left on its side and observed to determine whether or not the suds will persist for five minutes without breaking. If no suds has been produced, or if a suds is produced but has broken within the five minute period, another 2 ml. of the solution under test should be added and the process of pH value adjustment and shaking should be repeated. This procedure should be continued until a suds is obtained which will remain for five minutes without breaking.

The above test should be repeated for checking purposes in exactly the same manner except that all but 2 ml. of the volume of phosphate solution required in the first trial is added as the initial step in this check test. If the results of the first test are correct, this volume should fail to give a suds which is stable for five minutes. Next, phosphate solutions in 0.2 ml. steps with pH value adjustment should be added with intermittent shaking between each step until a suds stable for five minutes is again obtained. After the suds has persisted for the five minute period in this test, the bottle is again shaken for ½ minute and the stability of the suds checked for a second five minute period, nothing being added to the solution in the bottle for this check. The volume of solution under test required to produce a lather which is persistent for two successive five minute periods is observed and the test is repeated at least twice to obtain a good average for the volume of test solution required.

All solutions should be at 25° C. for the purposes of this test.

From the average volume of phosphate solution in milliliter required in the test, the calcium repressing power of the phosphate is calculated as milligrams of calcium (Ca) repressed per 100 milligrams of phosphate by the formula:

$$\frac{500}{\text{Average ml. of phosphate sol. required in test} \times \text{mg. of phosphate per ml. of phosphate sol.}}$$

By comparing the effectiveness of the original phosphate solution with a sample taken at any later time, the relative efficiency of the phosphate after exposure to reversion conditions can be directly calculated and the amount of reversion determined.

In Table I the stabilities at boiling temperatures of three compositions, A, B, and C, are shown each composition containing a sodium phosphate glass having a ratio of $Na_2O:P_2O_5$ of 1:1. Test solutions of each composition were made by dissolving in three liters of distilled water 24 grams of the sodium phosphate glass and adding 2.4 grams of $K_2CO_3$ to adjust the pH value to 8.3. This solution was then divided into three aliquot parts and to each I add 14 grams of a different alkaline potassium compound. The solutions were then heated to boiling and the stability of each composition determined by the test previously described herein.

*Table I*

| Solution No. | Phosphate Glass, g./L. | Stabilizing Compound | | Reversion in 6 hours, per cent |
|---|---|---|---|---|
| | | Name | g./L. | |
| A | 8 | potassium carbonate | 14 | 10 |
| B | 8 | potassium bicarbonate | 14 | 10 |
| C | 8 | potassium hydroxide | 14 | 20 |

When potassium carbonate is employed in my composition to stabilize the sodium phosphate glass thereof in aqueous solution which is heated to and held at boiling temperature for a period of approximately 32 hours, only 75% of the glassy phosphate will have reverted. In contrast, in a solution of glassy phosphate without any stabilizing agent under the same conditions, the phosphate would have been 75% reverted in a period of 6 hours.

In Table II, the stabilities at boiling temperatures of three compositions, A, B, and C are shown, each composition containing a potassium phosphate glass having a ratio of $K_2O:P_2O_5$ of 1:1. Test solutions of each composition were made by dissolving in three liters of distilled water 27.75 grams of the potassium phosphate glass and adding 1.8 grams of $Na_2CO_3$ to adjust the pH value to 8.3. This solution was then divided into three aliquot parts and to each I added 8 grams of a different alkaline sodium compound. The solutions were then heated to boiling and the stability of each composition determined by the test previously described herein.

*Table II*

| Solution No. | Phosphate Glass, g./L. | Stabilizing Compound | | Reversion in 6 hours, per cent |
|---|---|---|---|---|
| | | Name | g./L. | |
| A | 9.25 | sodium carbonate | 8 | 10 |
| B | 9.25 | sodium bicarbonate | 8 | 10 |
| C | 9.25 | sodium hydroxide | 8 | 15 |

If a curve were plotted with time and percent reversion as coordinates, the slope of the curve for the potassium phosphate glass stabilized by sodium carbonate would be such as to indicate that 75% reversion would not occur until the solution of the potassium phosphate glass-sodium carbonate composition had been held at boiling temperature for a period of about 30 hours.

Table III gives an indication of the effect of lowering the concentration of stabilizing chemical in a composition containing a sodium phosphate glass. To a series of solutions of the composition whose pH values have been adjusted to 8.3, potassium carbonate as the stabilizing agent was added in different amounts to each solution and each solution heated to and held at boiling temperature as in the examples of Tables I and II.

*Table III*

| Glass, g./L. | Potassium Carbonate Stabilizing Agent, g./L. | Reversion in 6 hours, per cent |
|---|---|---|
| 8 | 1 | 65 |
| 8 | 2 | 40 |
| 8 | 5 | 10 |
| 8 | 14 | 10 |

Compositions comprising alkaline glasses and stabilizing agents are also stable in aqueous solution. For example, a mixture of a sodium phosphate glass having a ratio of $Na_2O:P_2O_5$ of 1.4:1 and a stabilizing alkaline compound such as $K_2CO_3$ is stable in aqueous solution at elevated temperatures including boiling. An aqueous solution of a mixture of the 1.4 $Na_2O:1$ $P_2O_5$ glass and $K_2CO_3$ in the proportions of 8 grams of glassy phosphate and 14 grams of $K_2CO_3$ per liter of water will lose about 30% of its sequestering power on boiling of the solution for a period of 6 hours. The alkaline potassium phosphate glasses are similarly stabilized with alkaline compounds whose alkali metal is sodium.

The effect of lesser amounts of alkaline stabilizing agents on the loss of sequestering power of solutions of stabilized compositions containing the various water soluble alkali metal phosphate glasses follows the general pattern indicated by Table III.

Compositions comprising sodium phosphate glasses containing acid water or water of constitution and stabilizing agents are also materially more stable in aqueous solutions at elevated temperatures up to and including boiling than are the simple aqueous solutions of these glasses (i. e., solutions without stabilizing agent) under the same temperature conditions. Thus, for example, a sodium phosphate glass of the system $H_2O.Na_2O.P_2O_5$ containing about 0.12 mol $H_2O$, 1.07 mols of sodium oxide and 1 mol of $P_2O_5$ may be stabilized with an alkaline compound whose alkali metal is other than that of the phosphate glass. In the glass just described, the ratio of alkali metal oxide and water to $P_2O_5$ is 1.19:1. A glass of this composition has a pH value in solution which is less than 7, but greater than 6, and may be said to be an acid glass. An 8 gram per liter aqueous solution of this glass when adjusted to a pH value of 8.3 with potassium carbonate ($K_2CO_3$), and to which is added 14 grams of $K_2CO_3$ per 8 grams of glassy phosphate as the stabilizing agent, has a longer period of stability at boiling temperature as determined by the calcium repression or sequestering test than the unstabilized solution of a sodium phosphate glass having a ratio of $Na_2O$ to $P_2O_5$ of 1:1, and solutions of this glass and of sodium alkali of corresponding pH value. At the end of 6 hours, the solution had lost 30% of its sequestering power through hydration or reversion.

Compositions containing alkali-metal phosphate glasses may also be stabilized with respect to the sequestering properties of the glasses by employing organic alkaline compounds in such compositions. Organic compounds which are alkaline in solution may be employed as stabilizing agents for any phosphate glass without regard to the kind of alkali metal oxide component of the glass. Some of the organic compounds suitable as stabilizing agents are organic amines of all types including the salts of such amines as are alkaline in aqueous solution. As example of the amines, I may use diethylamine, triethanolamine, guanidine, propylenediamine, and cyclohexylamine. As example of the salts of such amines may be included the bicarbonates, carbonates, acetates, propionates, etc., which compounds are crystalline and alkaline reacting in aqueous solution.

By test, I have observed the stability of an aqueous solution containing 8 grams per liter of a sodium phosphate glass having a composition of 0.12 mol $H_2O$, 1.07 mols of sodium oxide ($Na_2O$), and 1 mol of phosphorous pentoxide ($P_2O_5$), the pH value of the solution having been adjusted to 8.3 with $K_2CO_3$ and stabilized with propylene diamine monoacetate. This solution when boiled for 6 hours had lost only 30% of its sequestering power through hydration or reversion of the phosphate. In this test the propylene diamine monoacetate was formed in the test solution by adding thereto the quantities of amine and acetic acid required to yield 2.6 grams of propylene diamine monoacetate. The ratio of phosphate glass to amine salt in this solution was 8:2.6.

Where ammonium carbonate is employed as stabilizing agent, or as both neutralizing and stabilizing agent, the quantities employed may be as indicated in Tables I, II, and III, and the examples thereafter described.

In the examples above described, distilled water has been employed to avoid the complications of testing for stability that would be introduced if calcium or other hardness producing salts were in these solutions. I have found that the calcium ions in solutions containing phosphate glass in concentrations such as exhibit the sequestering effect do not adversely alter the rate of reversion of the phosphate or increase the rate of loss of sequestering efficiency nor affect the stability of these phosphates which have been stabilized with the alkaline compounds herein described. Temperature of the solutions and time are far greater factors in the reversion of the glassy phosphate solutions whether stabilized or not, than is the factor of calcium ions. As examples of the effect of temperature and time, the following are illustrative: an 0.8% solution at room temperature of sodium phosphate glass having a ratio of

of 1.19:1 will revert to an extent of about 75% in 270 days, whereas an 0.8% solution of this glass stabilized with K₂CO₃ in a concentration of 1.4% after adjustment of the solution to pH value of 8.3, will revert about 15% in 365 days.

The practical value of phosphate glasses stabilized to retard reversion becomes immediately obvious. Where the glasses are to be used under conditions which stimulate or accelerate reversion, the stabilizing value can be utilized to advantage since it makes possible a saving in the amount of phosphate glass required in any given process or operation. Stabilization also makes it possible to prepare stable solutions of glassy phosphate and store them for long periods of time which otherwise would not remain effective during periods of storage. In case a controlled rate of reversion is desired, this effect can be applied so that not all of the glassy phosphate is destroyed in a short period of time.

My stabilized phosphate compositions are useful also in the conditioning of steam boiler waters. These stabilizing glassy phosphate compositions when dissolved provide effective solutions for feeding to the boiler, particularly where the solutions are to be stored for long periods. In many situations where unstabilized solutions of glassy phosphates are used, some difficulties are encountered especially where continuous feeding is practiced. When fed continuously to boiler feed water which passes through heaters, pumps, feedlines, economizers, water regulators, etc., under temperature conditions such that the unstabilized phosphate is so rapidly reverted as to be of little value in removing deposits or preventing precipitation in the equipment, deposits may actually increase. Because of this high reversion rate, it is customary to feed the phosphate intermittently to obtain temporarily high concentration which carry the depositing material on through to the boiler. Even under these conditions, trouble frequently develops because of extremely high temperatures. The stabilized phosphate solutions provide a method of carrying the glassy phosphates through the equipment without losing their effectiveness. In some situations, continuous feed of phosphates can be followed with assurance of freedom from deposits while in extreme cases, intermittent feed can be used to keep the lines free of deposits or to remove existing deposits. By selecting a stabilizing agent of the proper type and in proper concentration, it is possible also to maintain effective stability of the phosphate during its stay in the feed line while still obtaining the benefit of alkalinity control of the phosphate after it enters the water within the boiler water. In case alkali reduction of the water within the boiler is not required, it is possible to so stabilize the phosphate with the stabilizing agents that the reversion process can be so regulated that beneficial sludge formations are formed under controlled conditions.

In the field of water softening for industrial and domestic use, stabilization of the glassy phosphate is also of value. It is now necessary to use the solid phosphate glasses or solutions thereof which have been freshly prepared from the solid glasses to avoid the effect of the acid reversion products formed in storage of solutions which decrease the sequestering effectiveness thereof. These acid reversion products also interfere with detergency.

The composition comprising alkali-metal phosphate glass and stabilizing agent may be packaged and sold for general use for any purpose for which the glassy phosphate would be useful. A large field of use includes the applications where water softening by sequestration is the chief concern. In such applications sufficient amounts of the composition are added to fully sequester the hardness of the water. In other applications the surface active or threshold effect may be of chief interest. In such applications far less than the stoichiometric concentrations are used.

The composition may be used as an admixed component of alkalies, detergents, soaps, and other chemicals which are soluble in water and where the desirable properties of the stabilized phosphate composition are required.

Strangely enough, if the adjusting alkali and stabilizing agents are incorporated with the phosphate glass and fused, the stabilizing effect is lost because the resulting product will be crystalline and behaves as any crystalline phosphate having the same ratio of alkali-metal oxide to phosphorous pentoxide ratio.

In process applications it may be preferable to practice the process of invention in which case the conditions of the process are determined, the phosphate glass selected for the purpose is added to the water or process solution to be treated, and the stabilizing alkaline compound or compounds added in the amounts required. The amounts and kind of alkali are selected in view of the conditions encountered. If the process does not justify maximum stability, lesser amounts of the stabilizing agents may be employed to obtain a desired rate of reversion or loss of sequestering power, as determined by test of the solutions to which the phosphate and stabilizing agent are added.

Having thus described the invention, what I claim as new and desire to secure by Letters Patent is:

1. The method of retarding the reversion of alkali-metal phosphate glass in aqueous solutions which comprises adding to water a water-soluble alkali-metal phosphate glass having essentially but a single alkali-metal oxide constituent measuring the pH value of said water and, if below a value of about 8.3 adjusting the pH value to about 8.3 by adding an alkali-metal alkaline reacting salt thereto, and adding to said water a water-soluble alkali-metal alkaline crystalline compound the alkali-metal ion of which is other than the alkali-metal of the phosphate glass, the amounts of phosphate glass and of said alkaline crystalline compound added to the water being such that the concentration of the alkaline crystalline compound in said water will be in the ratio of about 8 grams of phosphate glass to at least 1 gram of said alkaline crystalline compound per liter of solution and produce a pH value in solution in excess of about 8.5, said solution being characterized by the fact that when heated to and maintained at boiling temperature and atmospheric pressure for about six hours, the alkali-metal orthophosphate formed by reversion of the phosphate glass is from about 10% to about 65% of the original weight of the alkali-metal phosphate glass contained in said solution.

2. A composition comprising a mixture of (a) a water-soluble alkali-metal phosphate glass having essentially but a single alkali-metal oxide constituent, (b) an alkali-metal alkaline reacting crystalline compound the alkali-metal of which is other than the alkali-metal of (a), the amount of (b) in said composition being such that when the composition is dissolved in water the pH value thereof will be in excess of about 8.5 and also being such that when an aqueous solution of (a) and (b) containing about eight grams of (a) not less than about 1 gram of (b) per liter is boiled continuously for about six hours, not more than about 65% of (a) will have reverted to water-soluble orthophosphate.

3. A composition comprising a mixture of (a) a water-soluble alkali-metal phosphate glass having essentially but a single alkali-metal oxide constituent having a pH value in aqueous solution of less than about 8.5, (b) an alkali-metal alkaline reacting compound, (c) an alkali-metal alkaline reacting crystalline compound other than (b) the alkali-metal of which is other than the alkali-metal of (a), the amount of (b) in said mixture being such as to produce a pH value in aqueous solution of (a) of about 8.5 and the amount of (c) being such as to produce a pH value in aqueous solution of (a), (b), and (c) in excess of about 8.5, the proportions of (a) to (c) being such that when the mixture is dissolved in water to produce a concentration of 8 grams per liter of (a), the concentration of (c) will be in the range of about 1 gram per liter to a value in excess of about 14 grams per liter, the mixture being characterized by the fact that when a solution having such concentration of (a) and (c) per liter of water is boiled continuously for a period of six hours the per cent reversion of the phosphate glass originally present in said solution to orthophosphate will be not less than about 10% nor more than about 65%.

4. A mixture containing effective amounts of an alkali-metal phosphate glass having essentially but a single alkali-metal oxide constituent, the ratio of alkali-metal oxide to phosphorous pentoxide being such that aqueous solutions of said glass will have pH values ranging from less than 7 but not exceeding about 8.3, an alkaline compound in amount sufficient to adjust the pH value of solutions of said glass to a value of at least 8.3, and an alkaline reacting alkali-metal crystalline compound having an alkali-metal other than the alkali-metal of said phosphate glass, said mixture being characterized by the fact that when added to water in an amount sufficient to produce a concentration of about 8 grams of phosphate glass per liter of solution, the concentration of alkali-metal crystalline compound will be at least in excess of 1 gram per liter of said solution, and being further characterized by the fact that when said solution is boiled for a period of six hours, less than 75% of the phosphate glass originally present in said solution will have reverted to orthophosphate.

5. A mixture according to claim 4 characterized by the fact that the composition of the alkali-metal phosphate glass is such that the pH value of solutions of said glass will be in excess of but not less than about 8.3 and being further characterized by the fact that the amount of said alkaline reacting crystalline compound is such as will increase the pH value of solutions of the mixtures of said glass and alkaline reacting compound to a value higher than the pH value of solutions containing only said phosphate glass.

6. A mixture of an alkali-metal phosphate glass having essentially but a single alkali-metal oxide constituent, and a ratio of alkali-metal oxide to phosphorous pentoxide of from about 0.8:1 to about 1.67:1, and an alkaline reacting alkali-metal crystalline compound the alkali-metal of which is other than the alkali-metal of the phosphate glass, the amount of alkaline reacting compound being at least sufficient to produce a concentration of 1 gram per liter when the mixture is dissolved in water in amount sufficient to produce a concentration of about 8 grams of glass per liter the pH value of which is not less than about 8.3, and a concentration of at least 1 gram per liter in excess of the alkali required to adjust solutions of acid and neutral glasses to a pH value of at least 8.3, said mixture being characterized by the fact that when dissolved in water and boiled for a period of six hours, the percent of orthophosphate resulting from reversion of said phosphate glass originally in said solution will lie in the range from about 10% to less than 75%.

7. The method of controlling the rate of reversion of an alkali-metal phosphate glass to an alkali-metal orthophosphate in aqueous solutions which consists in adding to water an alkali-metal phosphate glass having essentially but a single alkali-metal oxide constituent and a ratio of alkali-metal oxide to phosphorous pentoxide of from about 0.8:1 to about 1.67:1 measuring the pH of the solution and if below pH of about 8.3, adding alkali in amount sufficient to adjust the pH to about 8.3, and adding an alkaline reacting crystalline compound the alkali-metal of which is other than that of the phosphate glass in such an amount that the ratio of phosphate glass to said different alkali-metal alkaline reacting crystalline compound in said solution is in the range of about 8:1 to less than 1:1, said solution when boiled for about six hours being characterized by the fact that the amount of alkali-metal orthophosphate formed by reversion of said phosphate glass will be in the range of from about 10% to less than 75% of the weight of phosphate glass originally present in said solution.

CASIMIR J. MUNTER.

REFERENCES CITED

The following references are of record in the file of this patent:

UNITED STATES PATENTS

| Number | Name | Date |
| --- | --- | --- |
| 2,019,666 | Fiske | Nov. 5, 1935 |
| 2,081,617 | Draisbach | May 27, 1937 |
| 2,086,867 | Hall | July 13, 1937 |
| 2,130,557 | Munter | Sept. 20, 1938 |
| 2,215,814 | Hall | Sept. 24, 1940 |
| 2,288,418 | Partridge | June 30, 1942 |
| 2,333,444 | Robinson | Nov. 2, 1943 |
| 2,365,190 | Hatch | Dec. 19, 1944 |